United States Patent [19]
Sendzimir

[11] 3,906,618
[45] Sept. 23, 1975

[54] PROCESS FOR THE PRODUCTION OF BI-METALLIC SHEETS

[76] Inventor: Tadeusz Sendzimir, P.O. Box 1350, Waterbury, Conn. 06720

[22] Filed: Sept. 20, 1974

[21] Appl. No.: 507,956

[52] U.S. Cl. ............... 228/118; 228/235; 228/263; 219/10.41
[51] Int. Cl.² ........................................ B23K 19/00
[58] Field of Search ........ 29/497.5, 498, 470.9, 504

[56] References Cited
UNITED STATES PATENTS

| | | | |
|---|---|---|---|
| 3,132,418 | 5/1964 | Fulford | 29/498 X |
| 3,352,005 | 11/1967 | Avellone | 29/498 X |
| 3,387,357 | 6/1968 | Sendzimir | 29/498 X |
| 3,481,023 | 12/1969 | Jost et al | 29/497.5 |

*Primary Examiner*—Al Lawrence Smith
*Assistant Examiner*—K. J. Ramsey
*Attorney, Agent, or Firm*—Melville, Strasser, Foster & Hoffman

[57] ABSTRACT

A process of producing multi-layer metallic sheets or strip having like or different metallic layers, by hot rolling a pack of slabs in a heavy, one-step elongation in a cyclic mill, to strip gauge. The pack is fed to the feed rolls in the mill at a temperature below the oxidizing temperature of the slabs. At a particular point between the feed rolls and the point at which the work rolls of the cyclic mill first contact the surfaces of the pack, high intensity heat is applied to the outside faces of the pack. The pack, in its passage from the point at which high intensity heat is applied, toward the work rolls of the cyclic mill, is protected from heat loss by passing through heat insulating means. The point at which said heat is applied is chosen such, that the interfaces to be bonded reach oxidizing temperature at the point at which said work rolls first enter the pack, from which point on there is no further danger of oxidation.

10 Claims, 6 Drawing Figures

PROCESS FOR THE PRODUCTION OF BI-METALLIC SHEETS

BRIEF SUMMARY OF THE INVENTION

In the Sendzimir U.S. Pat. No. 3,387,357 dated June 11, 1968, there was disclosed and claimed a method of preparing clad metal wherein a stack of two descaled slabs with two stainless sheets between the descaled slabs and the stainless sheets separated by a magnesium oxide coating, was welded airtight all around and then heated and rolled on a cyclic mill in one pass to strip gauge. After rolling, each of the descaled slabs was bonded to one of the stainless sheets and the stainless sheets were prevented from bonding by the magnesium oxide therebetween. After the coil was box-annealed to strengthen the bond and the edges trimmed to cut off the welds, the stack was separated and produced two sheets or strips each comprising a low carbon steel clad on one face with a thin layer of stainless steel.

The process of said patent was actually quite complex on account of the welding operation. The present invention is designed to overcome the various objections encountered with the process of said patent.

According to the present invention, the stack of slabs and stainless steel material is deformed to sheet gauge in a single pass on a cyclic mill (e.g., a planetary mill) and in stacking the composite slab structure the slabs and sheets are simply stacked on top of each other without welding and are introduced to the feed rolls of the cyclic mill in cold condition. To obtain a higher production, the slabs may even be preheated but only to a temperature below active oxidation, say not over 400°C for low carbon steel. At a particular point between the feed rolls and the planetary mill, high intensity heat is applied to the outside faces of the two slabs. The heat may be applied by such means as oxygen-propane-burners whose flames impinge directly upon the outside faces of the slabs (and the composite passes through heat insulating means on its way to the planetary mill). The thus imparted high intensity heat produces a rapid increase in temperature in the surface layer of the slab such that it may even approach melting temperature while the inside is still cool.

The point at which the heat is first applied is chosen such that the zone where oxidation prior to the deformation under roll pressure would be deleterious to the welding process, does not reach an oxidizing temperature until deformation actually begins.

Thus, the length of the heating zone is determined by the quantity of heat required to bring each slab to the required deformation temperature, and the temperature equalization between the outside and inside layers takes place in the space between the end of the heating zone and the rollbite. To diminish heat losses from the hot outside faces of the slabs, I prefer to protect them by a heat insulating or reflecting shield, at least until the high heat from said outside layer has penetrated by conduction deeper into the slab. This step is not essential, but it saves energy and reduces oxidation.

While it is possible to follow the present process using a conventional, less intensive heating, I prefer to use high intensity heat, raising the flame temperature by preheating the air, enriching it with oxygen, or even substituting oxygen for air, so as to create a heat gradient within the slab, normal to its surface and thus to cause the opposite face of the slab to reach the desired deformation temperature at the precise point where the stack is already subjected to the roll pressure and when plastic deformation actually begins, with more precision than when heating is less intense.

But heating by impinging high temperature flames is only one way to produce such heat gradient. Ultra-high frequency induction heating (4000 Hz) can heat the surface layer of the slab equally well. There are other alternate methods such as electron beam, high intensity radiation, etc.

The present invention has great economic advantages in that a stainless clad sheet can be produced at such a low cost that the sales price need be not much more than the price of a galvanized sheet, and of course the clad sheet will have much greater utility.

Neither is the process limited to bonding of a noble metal cladding upon a less noble metal base. For example, if a stack is formed of three low carbon steel slabs only and selected stripes along their interfaces are treated with an anti-weld coating, the resulting strip can, after rolling and anneal, be expanded to form a cellular structure of great potential usefulness as lightweight structural member or heat insulator.

DETAILED DESCRIPTION

Figure 2:
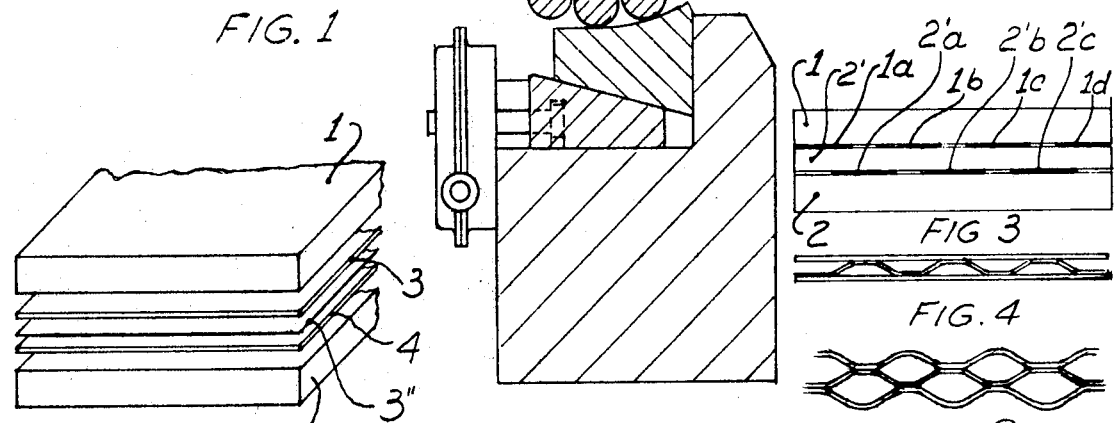
FIG. 2 shows the components of slabs to produce one multi-layer product.

In FIG. 2 there is shown a composite slab for producing stainless clad strips. The slabs 1 and 2 which are preferably low carbon steel and which have been descaled, for example by blasting with steel shot on their inner faces, are stacked with the stainless sheets 3 and 4 which are scale and grease free, and at least one of which is coated on the interface with a weld preventing coating 3' which may consist primarily of magnesium oxide as is well known. Preferably, the width of the stainless sheets 3 and 4 is slightly greater than the width of the slabs 1 and 2 since the slabs spread sideways slightly during the planetary deformation. If the excess width of the stainless sheets is correctly chosen, there will be no need to side trim the finished stainless clad low carbon steel strips.

Figure 1:
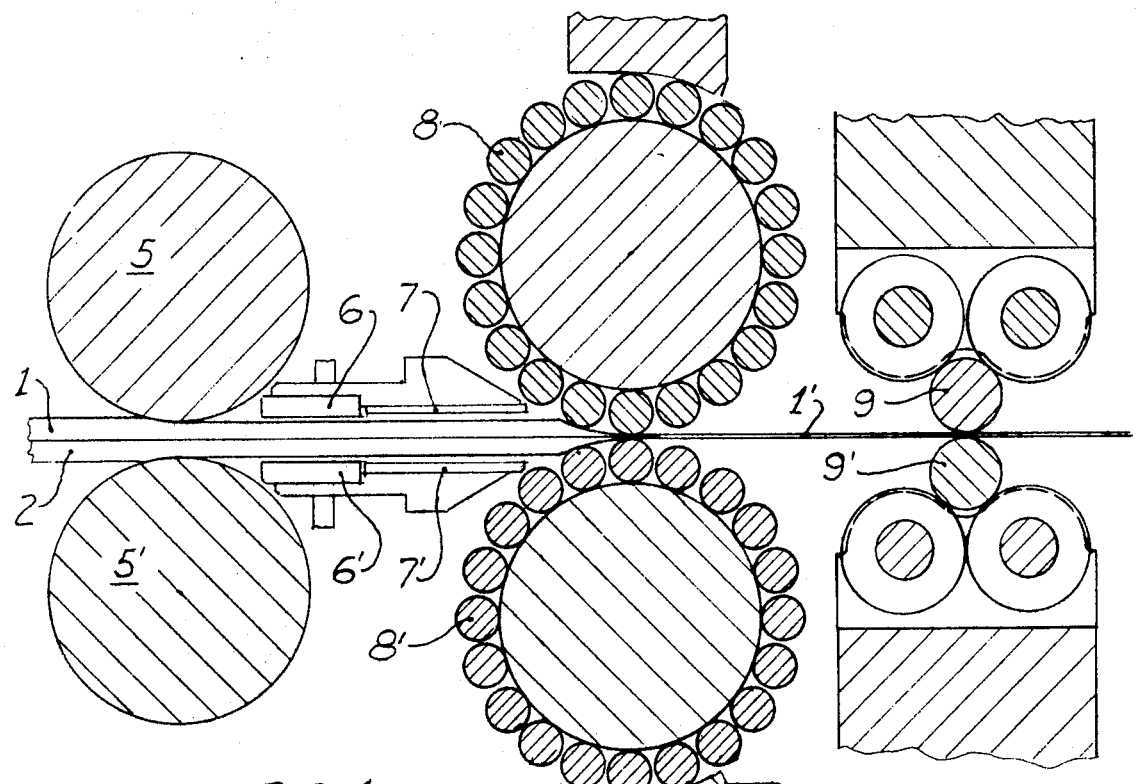
FIG. 1 is a schematic view in vertical cross section showing the unheated slab composite passing through the feed rolls, the heating and insulating means, the planetary mill and the finishing mill.

In FIG. 1 a composite slab such as shown in FIG. 2 is fed to the planetary mill by means of the feed rolls 5,5'. As indicated above, the composite of FIG. 2 is simply stacked without welding and introduced to the feed rolls 5,5' in cold condition. Before entering the bite of the planetary mill, the composite slab passes between the heating means 6,6' and the heat insulating means 7,7'. The composite is then reduced in one pass through the bite of the planetary rolls 8,8' to strip gauge, and may thereafter be passed through the planishing mill rolls 9,9'. After a box anneal in a non-oxidizing atmosphere to strengthen the bond, the strips may be coiled up individually, since there is nothing to hold them together like in the old process.

Figure 5:
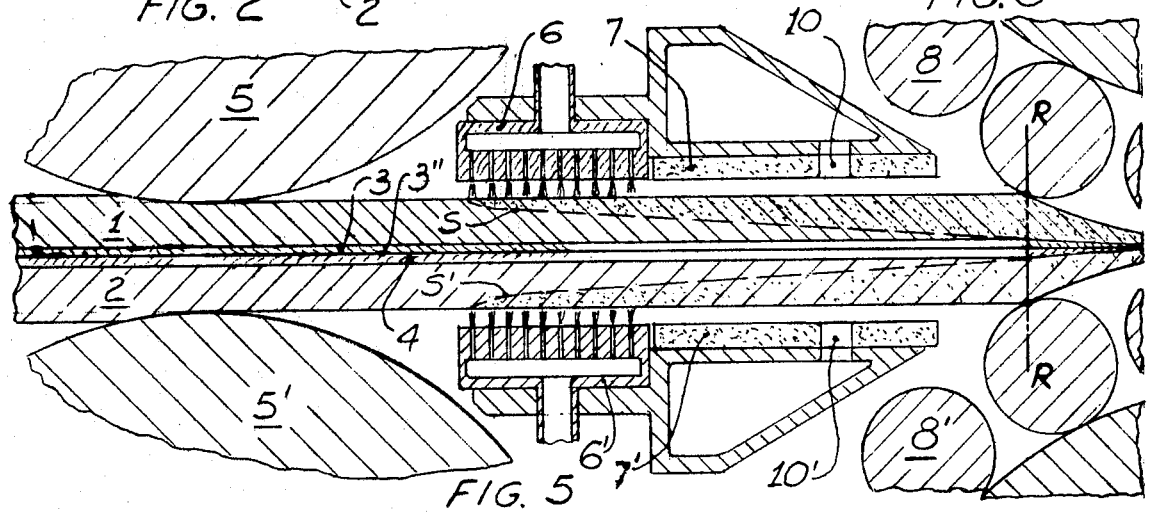
FIG. 5 is a detailed view of a part of FIG. 1 showing the heating and insulating means in greater detail.

Referring now more particularly to FIG. 5, the composite 1, 3, 3", 4, 2, after passing through the feed rolls 5,5', passes between the burners 6,6'. These burners subject the top face of the slab 1 and the bottom face of the slab 2 to intense heating. The burners comprise plates disposed parallel to the slabs at an optimum distance therefrom so that the slabs may absorb the maximum heat produced by the burners. The burners preferably utilize a carburizing gas, such as butane and oxygen, yielding flames of high temperature. This gas mixture is fed to the plates 6,6' through suitable piping and passes through mixing valves into the hollow plates 6,6'. These plates are provided with a forest of closely spaced holes, each of which emits a small but very hot flame. The holes are indicated at 6". These very hot flames are capable of heating the surfaces of the slabs to a temperature approaching the melting point which is the highest heat gradient the metal can stand.

The proportion of the gases is preferably adjusted to produce a slightly reducing flame and the combustion products are then led through the spaces between the slabs and the heat insulating means 7,7' and are then exhausted, by a fan if necessary, through holes 10 and 10'. These holes are disposed past the major portion of the heat insulating stretch after the high heat from the surface layer has gradually been absorbed by the bulk of the slabs 1,1'. Since the combustion products are reducing at that temperature, the highly heated outside layers of the slabs are prevented from scaling.

Heat penetration across the thickness of the slab begins from the first contact with the first row of burners 6", and by the time the slab surfaces have reached the end of the burner plates 6,6' in the direction of the planetary mill, the slabs have absorbed enough heat to bring their temperature to the correct deformation temperature, after the temperature gradient from the hot surfaces to the cool interior has about disappeared by virtue of conduction.

Very high frequency induction heating is also capable of producing the highest heat gradient the metal can stand. Electron beams and other combustibles are other alternative methods. Since some of these alternate heating means do not produce combustion gases whose reaction may be reducing, it is preferable to introduce a reducing atmosphere from outside sources to protect the outside layers of the slabs from excessive oxidation.

From the point at which heating ceases, the hot surfaces of the slabs are preferably protected from heat losses by plates 7,7' of heat insulating or reflecting material disposed close to and parallel to the slabs.

The length of time the outside layers of the slabs are transmitting the heat from the surfaces toward the interior including the stainless sheets 3,4, is determined by the thickness of the slabs, the conductivity of the metal (low carbon steel in the case described), and the heat gradient. Therefore with a given feeding speed of the feed rolls, the position of the heating zone is so calculated that the faces of the slabs which are in contact with the stainless steel sheet reach oxidizing temperature (500° to 600° C. for low carbon steel) at the points indicated by the line R R (FIG. 5) where the planetary rolls 8 and 8' first engage the slabs.

To interpret this heat penetration visually, the dotted lines S,S' have been drawn along the two slabs to indicate the progress of heat penetration. Thus, the areas outside the lines S,S' are above the oxidizing temperature and the areas inside the lines S and S' are below oxidizing temperature. It will be clear that the lines S,S' reach the stainless steel sheets 3,4 just at the point where the pack of slabs reaches the vertical line R R.

It is at this point that the one-step deformation down to strip gauge commences. During this deformation a large part of the energy expended by the rolls 8,8' in deformation is converted to heat, thereby increasing the temperature of the work piece. During deformation, roll pressure prevents access of air to the stainless steel-slab interface, so that there is no danger of oxidation. The areas of the interfaces are increased from about 20 to about 50 times and more by the slab to strip deformation so that any oxide or other particles that may have been present on the surfaces of the slabs of sheets in the original pack before deformation will represent only 2 to 5 percent of the interface area in the composite strip 1', while the rest of the surface is all new surface created by the deformation and there the weld bond is perfect. During subsequent annealing the quality of the bond is further enhanced. Recrystallization produces grains that tend to grow right through the interfaces and thus unite the two metals more securely.

The rapid one-step deformation of the work piece by the planetary rolls increases the temperature of the work piece as mentioned above so that a pack which may have entered at an average temperature of 700° C. would leave the roll bite as strip at a temperature from 850° to 900° C. However, this increment is completely under the control of the mill operator. If the slab is fed slower so that each work roll takes a lesser reduction while carrying away from the slab about the same amount of heat, a lower increment of temperature will be achieved. In many cases, such as the embodiment described herein, an increment in temperature is desirable since, as a general rule, metal surfaces have a higher tendency to diffuse into one another when under pressure and at high temperature. However, there are metal combinations where one or both may interpenetrate too much and create layers of an alloy which may have unacceptable proporties. For example, when cladding low carbon steels with aluminum, it is found that aluminum iron alloys are brittle, and if such a layer is present in an aluminum clad strip, the strip cannot be bent or drawn without the coating flaking off because of the brittleness of the alloy layer underneath.

The present process lends itself to the production of bi-metals such as just mentioned above, but in such case after the pack of slabs reaches the R R vertical of FIG. 5, the mill speed, feed, cooling, etc., must be so coordinated that any increment of heat produced by the energy of deformation is carried away by the work rolls and the temperature of the work piece is maintained constant while it is in the roll bite, preferably in the 600° to 700° C. range.

Planetary mills, for example according to U.S. Pat. No. 3,789,646 in which the entire planetary assembly is in turn backed by a rigid beam which is stationary and which acts as an outer race, if the whole planetary assembly is considered as a huge roller bearing, it is possible to obtain work roll pressures two to three times higher than was possible heretofore. This facilitates the rolling of metals at temperatures considerably lower than conventional hot rolling temperatures. Thus, rolling at 600° to 700° C. with the temperature remaining constant through the roll bite is well within the capacity of such mills.

On the other hand, when rolling steel at such lower temperatures, much more energy is consumed and on the contrary it is not only desirable, but certain new effects can be produced if the heat is left in the work pieces and produces a high temperature increment. The energy of plastic deformation, when deformation is started at temperatures as low as 600° C., can, depending on final gauge, amount to as much as 70 KWH per ton which can produce temperature increments of the order of 400° C. or more. Consequently, a stainless clad strip as shown in FIG. 2 can be rolled using suitable feeding and mill speeds and reductions, so as to exit from the mill above the upper recrystallization point (A3) so that after suitable further treatment such a sheet would have deep drawing properties.

The rolls 9,9' of FIG. 1 represent a finishing or planishing mill disposed in tandem with the planetary mill. Such a mill may be used to improve the surface of the strip 1' which may have slight traces left by the passage of the individual planetary rollers 8,8'. The planishing mill may even take a further reduction if desired.

Figure 3:
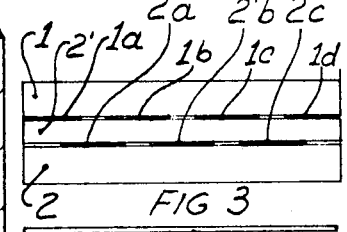
FIG. 3 is a view showing the components of slabs to produce a different multi-layer product.

In the modification of FIG. 3, the pack may be composed of three low carbon steel slabs 1, 2' and 2, which have been descaled on their interfaces and which may have weld preventing coating applied in stripes as at 1a, 1b, 1c, and 1d on the interface between the slabs 1 and 2', and on the interface between slabs 2 and 2' as at 2'a, 2'b, and 2'c. The weld preventing coating may be of course applied to either one of the contacting surfaces.

The resulting strip then has three layers united by welding along areas where there was no weld preventing coating applied and unwelded along the coated stripes. Such a strip can subsequently be expanded as for example by internal air pressure into a cavity of a suitable parallel face mold to produce a multi-cellular structure shown in FIG. 4, where the slabs 1,2 are reduced to flat outside sheets and the inside slab 2' also reduced to sheet gauge is welded onto the sheets 1 and 2 at stripes where there was no weld preventive coating. Thus the sheet 2' is corrugated by the expansion by the fluid pressure.

Figure 4:
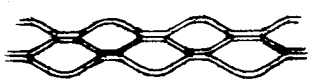
FIG. 4 is a fragmentary cross sectional view of a finished product resulting from the slab composite of FIG. 3.
Figure 6:
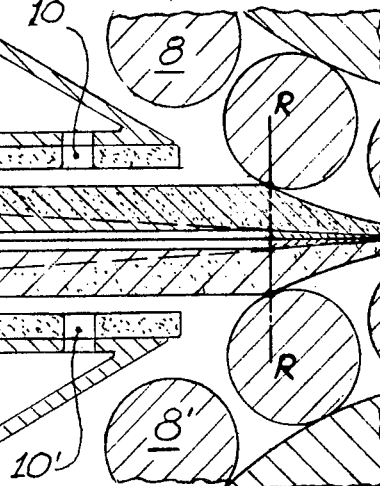
FIG. 6 is a view similar to FIG. 4 showing a fragmentary cross section of another finished product produced from the slab composite of FIG. 3.

The product of FIG. 6 is produced similarly to that of FIG. 4 except that the expansion is free, i.e. without a parallel face mold so that the outer sheets are also corrugated.

Structures such as in FIGS. 4 and 6 are useful for many purposes and of course many combinations of metals, numbers of layers, thickness proportions, and patterns of weld preventing striping are possible. These products may form structural slabs for floors or walls, structural members capable of simultaneous service as cooling or heating elements when gases or liquids of suitable temperature are passed through them, or even for heat insulation. They may be light weight and yet rigid and capable of carrying heavy loads.

If instead of a stack of two low carbon steel slabs, a stack of three such slabs is provided, with a pair of stainless steel sheets (separated from each other by an anti-weld coating) at both the low carbon slab interfaces, there will be obtained, after rolling and anneal, two low carbon steel sheets with a stainless steel cladding on one face, plus another low carbon steel sheet (the central one) having a stainless steel cladding on both faces.

It will be clear that numerous modifications may be made without departing from the spirit of the invention. Therefore, no limitation not specifically set forth in the claims is intended and no such limitation should be implied.

The embodiments of the invention in which an exclusive property or privilege is claimed are defined as follows:

1. The process of producing strip composed of a plurality of layers of metals, by hot rolling a pack of slabs of said metals in a heavy, one-step elongation in a cyclic mill, to strip gauge, which includes the steps of:
   a. assembling a pack of said slabs,
   b. feeding said pack to the feed rolls of a cyclic mill at a temperature below oxidation temperature,
   c. applying high intensity heat to the two outside faces of said pack, at an area upstream of said cyclic mill;

said area at which said heat is applied being at a distance from the first contact point of the work rolls of said cyclic mill, such that the interfaces between the slabs making up the pack and which are to be bonded, do not reach oxidation temperature before said first contact point, from which point on there is no danger of oxidation.

2. The process of claim 1, including the step of insulating said pack as it passes from the point at which said application of heat ceases to the point at which the work rolls of said cyclic mill first contact the surfaces of said pack.

3. The process of claim 1, wherein said pack consists of three slabs, and including the step of treating selected areas of the faces to be bonded with a welding separator, whereby the resulting strip may be expanded into a cellular structure.

4. The process of claim 3, wherein said pack consists, in the order named, of a first layer of a low carbon steel, a first layer of a chromium steel, a layer of welding separator, a second layer of chromium steel, and a second layer of a low carbon steel, resulting, upon separation, in two strips of low carbon steel, each bonded on one side to a strip of chromium steel.

5. The process of claim 3, wherein said pack consists, in the order named, of a first layer of low carbon steel, a first layer of chromium steel, a layer of welding separator, a second layer of chromium steel, a second layer of low carbon steel, a third layer of chromium steel, a layer of welding separator, a fourth layer of chromium steel and finally a third layer of low carbon steel.

6. The process of claim 3, including the step of descaling said steel layers on their faces to be bonded, prior to assembling them into said pack.

7. The process of claim 3, wherein the chromium steel layers are slightly wider than said low carbon steel layers, whereby side trimming of the finished strip may be avoided.

8. The process of claim 1, wherein said high intensity heat is produced by combustion of a carburizing gas and oxygen in a number of directly impinging flames, capable of heating the outside surface of the pack to a temperature approaching its melting point.

9. The process of claim 8, wherein the combustion products of said flames are caused to flow along the surfaces of said pack in the direction of feed of the pack within said insulation to reduce oxidation of said slabs.

10. The process of claim 1, wherein said high intensity heat is produced by electric (electronic) means such as ultra high frequency induction, to generate heat in the surface layer of the slab.

* * * * *